(12) United States Patent
Ahn et al.

(10) Patent No.: US 8,755,014 B2
(45) Date of Patent: Jun. 17, 2014

(54) LIQUID CRYSTAL DISPLAY AND A DISPLAY PANEL THEREFOR

(75) Inventors: Soon-Il Ahn, Busan-si (KR); You-Lee Song, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 1423 days.

(21) Appl. No.: 11/222,103

(22) Filed: Sep. 8, 2005

(65) Prior Publication Data

US 2006/0059837 A1 Mar. 23, 2006

(30) Foreign Application Priority Data

Sep. 9, 2004 (KR) .................. 10-2004-0072221

(51) Int. Cl.
G02F 1/1337 (2006.01)
G02F 1/1343 (2006.01)

(52) U.S. Cl.
USPC ............................ 349/129; 139/143; 139/146

(58) Field of Classification Search
USPC ................. 349/139, 142–147, 129
See application file for complete search history.

(56) References Cited

U.S. PATENT DOCUMENTS

| 7,304,703 B1 * | 12/2007 | Takeda et al. | 349/129 |
| 2002/0093615 A1 * | 7/2002 | Mun et al. | 349/143 |
| 2002/0105610 A1 * | 8/2002 | Takeda et al. | 349/129 |
| 2003/0071951 A1 * | 4/2003 | Jun | 349/129 |
| 2003/0133055 A1 | 7/2003 | Um et al. | |
| 2004/0090581 A1 * | 5/2004 | Song et al. | 349/129 |
| 2004/0135147 A1 * | 7/2004 | Kim et al. | 257/59 |
| 2004/0160560 A1 * | 8/2004 | Kim et al. | 349/129 |
| 2004/0227888 A1 * | 11/2004 | Tak et al. | 349/139 |
| 2005/0030460 A1 * | 2/2005 | Kim et al. | 349/139 |
| 2005/0122459 A1 * | 6/2005 | Song et al. | 349/139 |

FOREIGN PATENT DOCUMENTS

| KR | 1020010035578 | | 5/2001 | |
| KR | 1020020041998 | | 6/2002 | |
| KR | 100345961 | | 7/2002 | |
| KR | 1020030071707 | * | 10/2003 | 349/139 |
| WO | 03/096113 | | 11/2003 | |
| WO | 2004010212 | | 1/2004 | |

* cited by examiner

Primary Examiner — Jessica M Merlin
(74) Attorney, Agent, or Firm — F. Chau & Associates, LLC

(57) ABSTRACT

A thin film transistor array panel for a liquid crystal display, a liquid crystal display and a manufacturing method thereof are provided. The display panel includes: a substrate; and a first electrode portion disposed on the substrate, the first electrode portion having two pairs of main edges facing each other and a first cutout oblique to the main edges, wherein the main edges include first and second edges, the first electrode portion has an oblique edge substantially parallel to the first cutout, the oblique connecting the first edge and the second edge, the first edge includes a first portion extending from the oblique edge to an end of the first cutout, and the oblique edge is substantially equal to or longer than a half of the first portion of the first edge.

39 Claims, 10 Drawing Sheets

LIQUID CRYSTAL DISPLAY AND A DISPLAY PANEL THEREFOR

BACKGROUND OF THE INVENTION

1. Technical Field

The present invention relates to a thin film transistor array panel for a liquid crystal display and a manufacturing method thereof.

2. Discussion of the Related Art

A liquid crystal display (LCD) is one of the most widely used flat panel displays. For example, an LCD is commonly found in a variety of electronic devices such as flat screen televisions, laptop computers, cell phones and digital cameras.

An LCD includes two panels provided with field-generating electrodes such as pixel electrodes and a common electrode with a liquid crystal (LC) layer interposed therebetween. The LCD displays images by applying voltages to the field-generating electrodes to generate an electric field in the LC layer, which determines orientations of LC molecules in the LC layer to adjust polarization of incident light.

The LCD further includes a plurality of switching elements connected to the pixel electrodes and a plurality of signal lines such as gate lines and data lines for controlling the switching elements to apply voltages to the pixel electrodes.

Recently, vertical alignment (VA) mode LCDs, which align LC molecules such that the long axes of the LC molecules are perpendicular to the panels in the absence of an electric field, have been used in the production of larger size displays for both LCD monitors and LCD television applications because they enable the manufacture of LCDs with higher contrast and wider viewing angles.

The wide viewing angle of the VA mode LCD can be realized by cutouts in the field-generating electrodes and protrusions on the field-generating electrodes. Since the cutouts and the protrusions can determine the tilt directions of the LC molecules, the tilt directions can be distributed into several directions by appropriately arranging the cutouts and the protrusions such that the reference viewing angle is widened.

The electric field applied to the LC layer is often enhanced to increase its luminance by raising the voltage applied to the pixel electrodes. Therefore, the electric field generated between the data lines and the pixel electrodes is also increased to disorder the orientations of the LC molecules disposed near edges of the pixel electrodes, thereby increasing the response time of the LC layer.

In the VA mode LCD, since incident light may not pass through the protrusions and the cutouts, larger protrusions or larger cutouts may decrease the aperture ratio. However, by keeping the protrusions or cutouts farther apart from each other to increase the aperture ratio, the availability of the protrusions or the cutouts may diminish and may instead amplify the disturbance of the electric field caused by the data lines, thereby elongating the response time of the LC layer.

SUMMARY OF THE INVENTION

A display panel according to an embodiment of the present invention includes: a substrate; and a first electrode portion disposed on the substrate, the first electrode portion having two pairs of main edges facing each other and a first cutout oblique to the main edges, wherein the main edges include first and second edges approaching each other, the first electrode portion has an oblique edge substantially parallel to the first cutout, the oblique edge connecting the first edge and the second edge, the first edge includes a first portion extending from the oblique edge to an end of the first cutout, and the oblique edge is substantially equal to or longer than a half of the first portion of the first edge.

The oblique edge may be longer than the first portion of the first edge. The oblique edge may make an angle larger than about 135 degrees with the first portion of the first edge.

The first edge may further include a second portion making an obtuse angle with the first portion of the first edge, and the oblique edge may extend substantially perpendicular to the second portion of the first edge.

The first cutout may meet the second edge and the second edge may include a portion meeting the first cutout making an angle larger than about 135 degrees.

The first electrode portion may further have a second cutout extending substantially parallel to the first cutout and longer than the first cutout, and the main edges may further include a third edge facing the first edge and meeting the second edge. The third edge may include a portion meeting the second cutout making an angle of about 135 degrees.

The display panel may further include a second electrode portion that is disposed on the substrate and connected to the first electrode portion. The first and the second electrode portions may substantially have an inversion symmetry, for example, with respect to a straight line extending nearly parallel to the second edge.

A liquid crystal display according to an embodiment of the present invention includes: a first electrode portion having two pairs of main edges that face each other; a common electrode facing the first electrode portion; a liquid crystal display disposed between the first electrode portion and the common electrode; a plurality of first tilt direction determining members that are provided at the first electrode portion, which extend substantially parallel to each other making oblique angles with the main edges of the first electrode portion, and that determine tilt directions of liquid crystal molecules in the liquid crystal layer; and a plurality of second tilt direction determining members that are provided at the common electrode, which include first portions extending substantially parallel to the first tilt direction determining members, and are arranged alternate to the first tilt direction determining members, and that determine tilt directions of liquid crystal molecules in the liquid crystal layer.

The first electrode portion is divided into a plurality of sub-areas by the first and the second tilt direction determining members and edges of the first electrode portion. Each sub-area has a pair of primary edges extending substantially parallel to the first tilt direction determining members and a pair of secondary edges connecting the primary edges. The sub-areas include a first sub-area disposed near a corner of the first electrode portion. The primary edges of the first sub-area include a first edge and a second edge longer than the first edge. The first edge of the first sub-area is longer than a half of at least one of the secondary edges of the first sub-area.

The first edge of the first sub-area may be longer than the at least one of the secondary edges of the first sub-area, and the first edge of the first sub-area may make an angle larger than about 135 degrees with the at least one of the secondary edges of the first sub-area.

The first edge of the first sub-area and the at least one of the secondary edges of the first sub-area may be portions of the edges of the first electrode portion, and the second edge of the first sub-area may be a portion of the first tilt direction determining members. The first tilt direction determining members may include cutouts formed at the first electrode portion.

At least one pair of the primary and secondary edges of each sub-area may make an angle larger than 135 degrees.

The at least one pair of each sub-area making an angle larger than 135 degrees may include: portions of the edges of the first electrode portion; a portion of the edges of the first electrode portion and a portion of the first tilt direction determining members; or portions of the second tilt direction determining members.

At least one pair of the primary and secondary edges of each sub-area may make an acute angle, and the secondary edge of the at least one pair may have a plurality of slits that are disposed near a vertex made by the at least one pair and extend substantially parallel to the primary edges of each sub-area.

The liquid crystal display may further include a polarizer having a polarization axis that makes an angle substantially equal to about 45 degrees with the first tilt direction determining members. The number of the sub-areas may be five.

The first tilt direction determining members may include cutouts formed at the first electrode portion, and the second tilt direction determining members may include cutouts formed at the common electrode. The liquid crystal display may further include a storage electrode overlapping the first tilt direction determining members.

The liquid crystal display may further include a second electrode member that is connected to the first electrode portion and substantially has an inversion symmetry with the first electrode portion. A distance between the primary edges of each sub-area may be smaller than about 20 microns.

A liquid crystal display according to another embodiment of the present invention includes: a first electrode; a second electrode facing the first electrode; a liquid crystal display: disposed between the first electrode and the second electrode; and first and second partitioning members that partition the first electrode into a plurality of sub-areas, wherein the sub-areas include a trapezoidal sub-area having a first edge and a second edge that is parallel to the first edge, shorter than the first edge, and has a length equal to or greater than a half of the first edge.

The trapezoidal sub-area may further have a third edge making an obtuse angle with the second edge. The third edge of the trapezoidal sub-area may make an angle larger than about 135 degrees with the second edge.

The trapezoidal sub-area may further have a fourth edge meeting the second and the third edges and making obtuse angles with the first edge and the third edge.

The first edge and the third edge of the trapezoidal sub-area may make an acute angle, and the third edge may have a plurality of slits that are disposed near a vertex made by the first edge and the third edge and extend substantially parallel to the first edge.

The first partitioning members may be provided at the first electrode and the first to the third edges of the trapezoidal sub-area may be defined by the first partitioning members. The first partitioning members may include cutouts formed at the first electrode.

The liquid crystal display may further include a polarizer having a polarization axis that makes an angle substantially equal to about 45 degrees with the first partitioning members. A distance between the primary edges of each sub-area may be smaller than about 20 microns.

BRIEF DESCRIPTION OF THE DRAWINGS

The present invention will become more apparent by describing in detail exemplary embodiments thereof with reference to the accompanying drawings, in which.

DETAILED DESCRIPTION OF EXEMPLARY EMBODIMENTS

Figure 1:
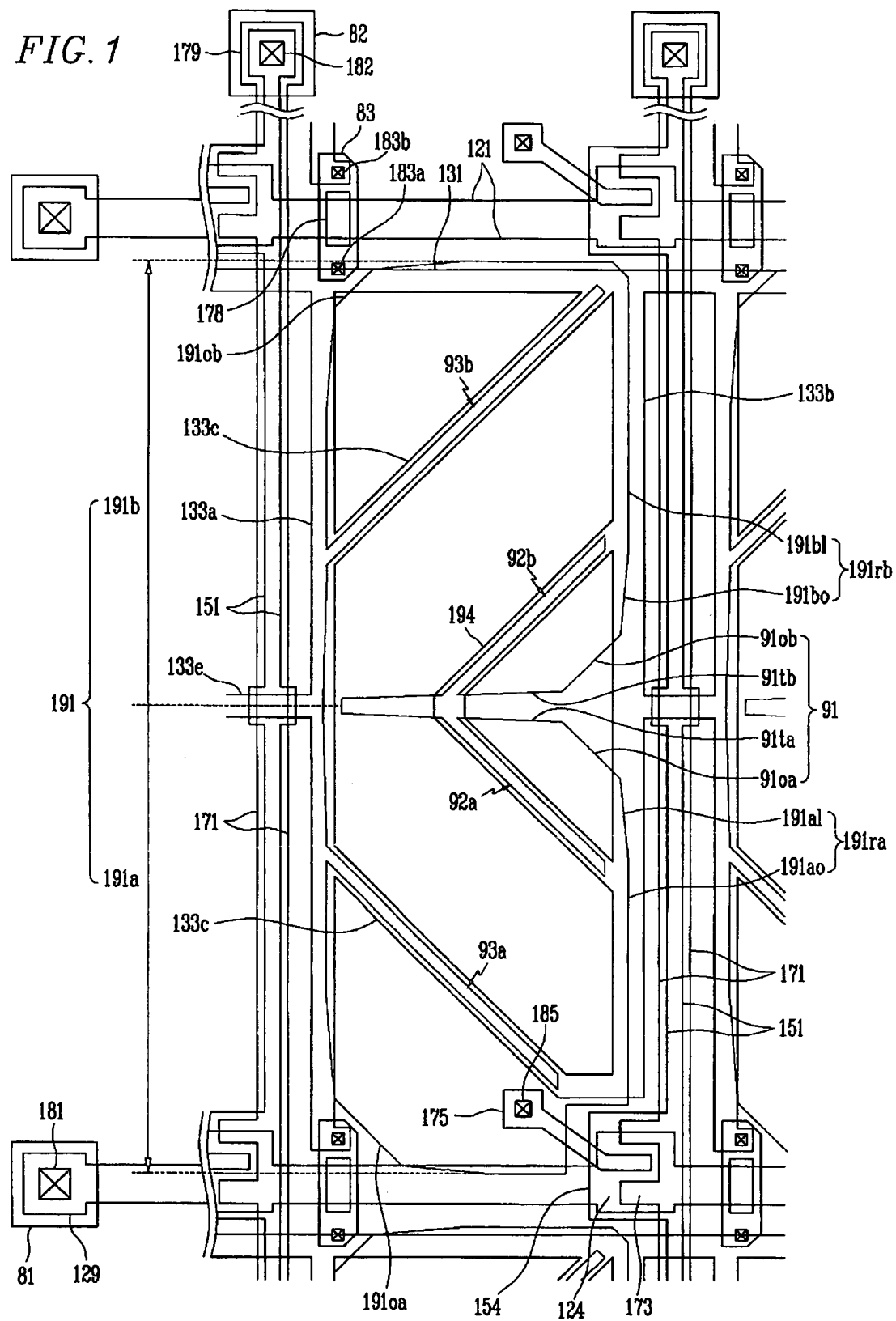
FIG. 1 is a layout view of a TFT array panel for an LCD according to an exemplary embodiment of the present invention.

The present invention will be described more fully hereinafter with reference to the accompanying drawings, in which exemplary embodiments of the invention are shown. This invention may, however, be embodied in many different forms and should not be construed as limited to the embodiments set forth herein. Like numerals refer to like elements throughout.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

An LCD according to an embodiment of the present invention will now be described in detail with reference to FIGS. 1-8.

Figure 2:
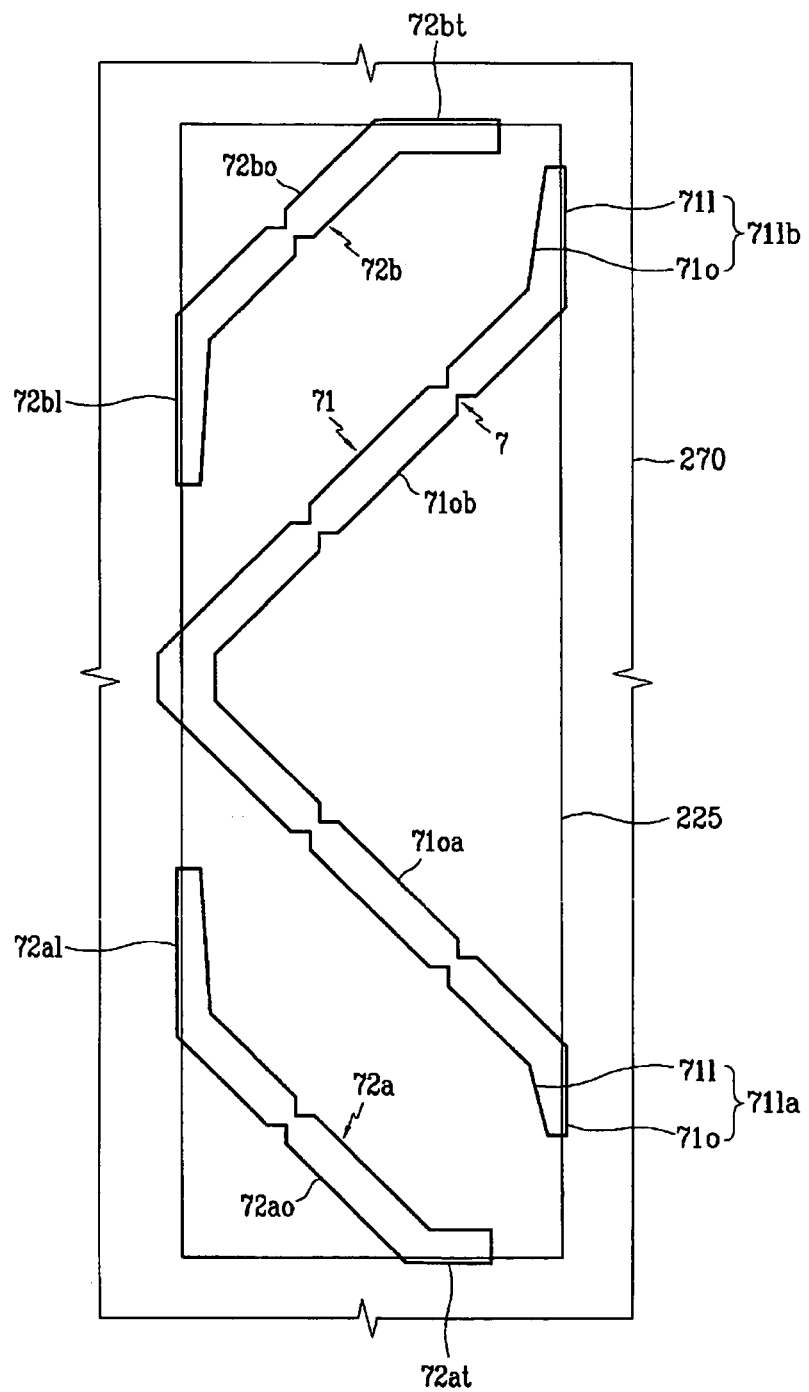
FIG. 2 is a layout view of a common electrode panel for an LCD according to an exemplary embodiment of the present invention.
Figure 3:
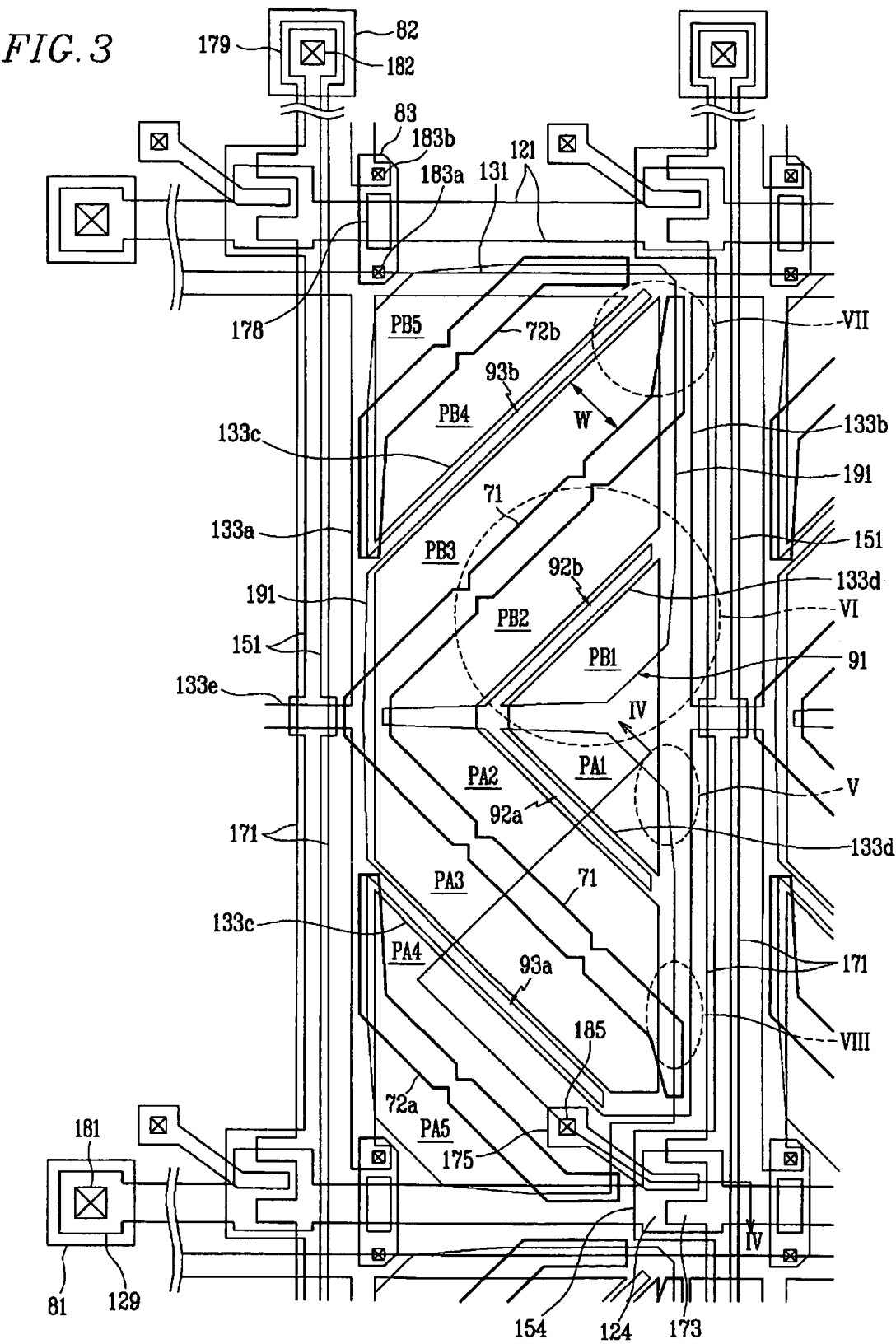
FIG. 3 is a layout view of an LCD including the TFT array panel shown in FIG. 1 and the common electrode panel shown in FIG. 2.
Figure 4:
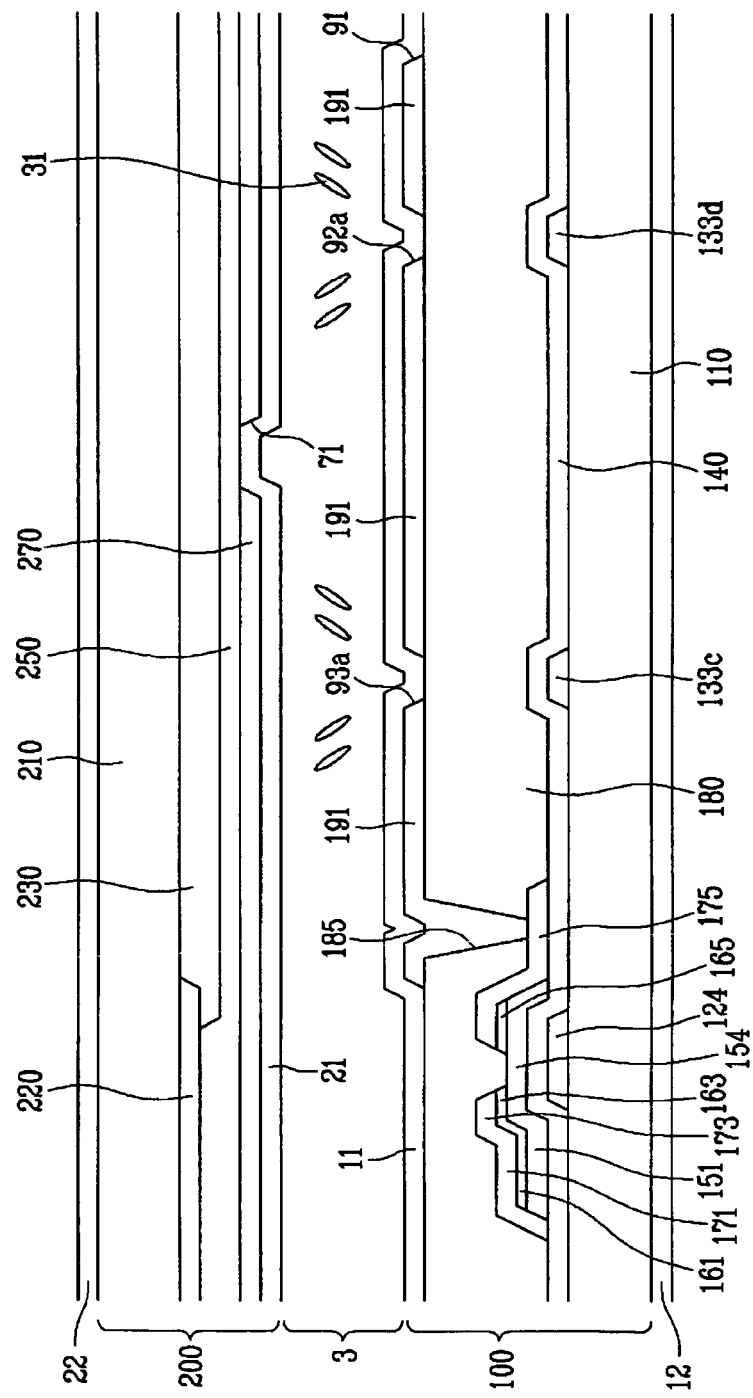
FIG. 4 is a sectional view of the LCD shown in FIG. 3 taken along a line IV-IV.
Figure 5:
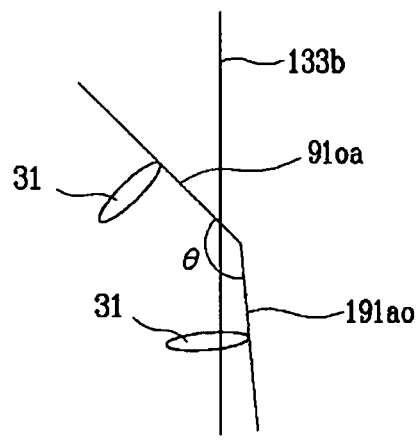
FIG. 5 is an expanded view of a portion of a pixel electrode enclosed by a circle V in FIG. 3.

FIG. 1 is a layout view of a thin film transistor (TFT) array panel for an LCD according to an embodiment of the present invention, FIG. 2 is a layout view of a common electrode panel for an LCD according to an embodiment of the present invention, FIG. 3 is a layout view of an LCD including the TFT array panel shown in FIG. 1 and the common electrode panel shown in FIG. 2, and FIG. 4 is a sectional view of the LCD shown in FIG. 3 taken along line IV-IV. FIG. 5 is an expanded view of a portion of a pixel electrode enclosed by a circle V in FIG. 3, and FIGS. 6, 7 and 8 are expanded views of portions of the LCD enclosed by circles VI, VII and VIII in FIG. 3, respectively.

Referring to FIGS. 1-4, an LCD includes a TFT array panel 100, a common electrode panel 200 facing the TFT array panel 100, and an LC layer 3 interposed between the panels 100 and 200.

First, the TFT array panel 100 will be described with reference to FIGS. 1, 3 and 4.

A plurality of gate lines 121 and a plurality of storage electrode lines 131 are formed on an insulating substrate 110 such as a transparent glass or plastic.

The gate lines 121 transmit gate signals and extend substantially in a transverse direction. Each of the gate lines 121 includes a plurality of gate electrodes 124 projecting in upward and downward directions and an end portion 129 having a large area for contact with another layer or an external driving circuit. A gate driving circuit (not shown) for generating the gate signals may be mounted on a flexible printed circuit (FPC) film (not shown), which may be attached to the substrate 110, directly mounted on the substrate 110, or integrated onto the substrate 110. The gate lines 121 may also extend to be connected to a driving circuit that may be integrated on the substrate 110.

The storage electrode lines 131 are supplied with a predetermined voltage and each of the storage electrode lines 131 includes a stem extending substantially parallel to the gate lines 121, a plurality of sets of first, second, third and fourth storage electrodes 133a, 133b, 133c and 133d branched from the stem, and a plurality of storage connections 133e. Each of the storage electrode lines 131 is disposed between two adjacent gate lines 121 and the stem is close to an upper gate line of the two adjacent gate lines 121.

The first and the second storage electrodes 133a and 133b extend in a longitudinal direction from the stem and face each other. Each of the first and the second storage electrodes 133a and 133b has a first end portion connected to the stem and a second end portion disposed opposite the first end portion. The third storage electrode 133c obliquely extends approximately from the first storage electrode 133a and the first and the second end portions of the second storage electrode 133b, respectively. The fourth storage electrode 133d includes a pair of oblique portions, which obliquely extend from upper and lower intermediate portions of the second storage electrode 133b toward the first storage electrode 133a, to meet each other. Each of the storage connections 133e is connected between adjacent sets of storage electrodes 133a-133d. It is to be understood by one of ordinary skill in the art, that the storage electrode lines 131 may have various shapes and arrangements.

The gate lines 121 and the storage electrode lines 131 are preferably made of an Al containing metal such as Al and Al alloy, an Ag containing metal such as Ag and Ag alloy, a Cu containing metal such as Cu and Cu alloy, a Mo containing metal such as Mo and Mo alloy, Cr, Ta, or Ti. However, the gate lines 121 and storage electrode lines 131 may have a multi-layered structure including two conductive films (not shown) having different physical characteristics. For example, one of the two films may preferably be made of a low resistivity metal including an Al containing metal, an Ag containing metal, and a Cu containing metal for reducing signal delay or voltage drop. The other film may preferably be made of a material such as a Mo containing metal, Cr, Ta, or Ti, which has good physical, chemical, and electrical contact characteristics when combined with other materials such as indium tin oxide (ITO) or indium zinc oxide (IZO). Exemplary combinations of the two films include a lower Cr film and an upper Al (alloy) film and a lower Al (alloy) film and an upper Mo (alloy) film. It is to be understood by one of ordinary skill in the art, that the gate lines 121 and the storage electrode lines 131 may be made of various metals or conductors.

The lateral sides of the gate lines 121 and the storage electrode lines 131 are inclined relative to a surface of the substrate 110, and the inclination angle thereof ranges from about 30-80 degrees.

A gate insulating layer 140 preferably made of silicon nitride (SiNx) or silicon oxide (SiOx) is formed on the gate lines 121 and the storage electrode lines 131.

A plurality of semiconductor stripes 151 preferably made of hydrogenated amorphous silicon (a-Si) or polysilicon are formed on the gate insulating layer 140. The semiconductor stripes 151 extend substantially in the longitudinal direction and become wide near the storage electrode lines 131 such that the semiconductor stripes 151 cover large areas of the storage electrode lines 131. Each of the semiconductor stripes 151 includes a plurality of projections 154 branched out toward the gate electrodes 124.

A plurality of ohmic contact stripes and islands 161 and 165 are formed on the semiconductor stripes 151. The ohmic contact stripes and islands 161 and 165 are preferably made of n+hydrogenated a-Si heavily doped with an n type impurity such as phosphorous or they may be made of silicide. Each ohmic contact stripe 161 includes a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to the surface of the substrate 110, and the inclination angles thereof are preferably in a range from about 30-80 degrees.

A plurality of data lines 171, a plurality of drain electrodes 175, and a plurality of isolated metal pieces 178 are formed on the ohmic contacts 161 and 165 and the gate insulating layer 140.

The data lines 171 transmit data signals and extend substantially in the longitudinal direction to intersect the gate lines 121, the stems of the storage electrode lines 131 and the storage connections 133e. Each data line 171 includes a plurality of source electrodes 173 that are curved, for example, like a crescent, projecting toward the gate electrodes 124 and an end portion 179 having a large area for contact with another layer or an external driving circuit. A data driving circuit (not shown) for generating the data signals may be mounted on a FPC film (not shown), which may be attached to the substrate 110, directly mounted on the substrate 110, or integrated onto the substrate 110. The data lines 171 may extend to be connected to a driving circuit that may be integrated on the substrate 110.

The drain electrodes 175 are separated from the data lines 171 and are disposed opposite the source electrodes 173 with respect to the gate electrodes 124. Each drain electrode 175 includes a wide end portion and a narrow end portion. The narrow end portion is partly enclosed by a source electrode 173.

A gate electrode 124, a source electrode 173, and a drain electrode 175 along with a projection 154 of a semiconductor stripe 151 form a TFT having a channel formed in the projection 154 disposed between the source electrode 173 and the drain electrode 175.

The metal pieces 178 are disposed on the gate electrodes 121 near the first storage electrodes 133a.

The data lines 171, the drain electrodes 175, and the metal pieces 178 are preferably made of a refractory metal such as Cr, Mo, Ta, Ti, or alloys thereof. However, they may have a multilayered structure including a refractory metal film (not shown) and a low resistivity film (not shown). Examples of the multi-layered structure include a double-layered structure including a lower Cr/Mo (alloy) film and an upper Al (alloy) film and a triple-layered structure including a lower Mo (alloy) film, an intermediate Al (alloy) film, and an upper Mo (alloy) film. It is to be understood by one of ordinary skill in the art, that the data lines 171, the drain electrodes 175, and the metal pieces 178 may be made of various metals or conductors.

The data lines 171, the drain electrodes 175, and the metal pieces 178 have inclined edge profiles, and the inclination angles thereof range from about 30-80 degrees.

The ohmic contacts 161 and 165 are interposed only between the underlying semiconductor stripes 151 and the overlying conductors 171 and 175 thereon. This configuration reduces the contact resistance between the semiconductor stripes 151 and the overlying conductors 171 and 175. Although the semiconductor stripes 151 are mostly narrower than the data lines 171, the width of the semiconductor stripes 151 becomes large near the storage electrode lines 131 to smooth the profile of the surface, thereby preventing the data lines 171 from disconnecting. The semiconductor stripes 151 include some exposed portions, which are not covered with the data lines 171 and the drain electrodes 175, such as portions located between the source electrodes 173 and the drain electrodes 175.

As further shown in FIGS. 1, 3 and 4, a passivation layer 180 is formed on the data lines 171, the drain electrodes 175, the metal pieces 178, and the exposed portions of the semiconductor stripes 151. The passivation layer 180 is preferably made of an inorganic or organic insulator and it may have a flat top surface. Examples of the inorganic insulator include silicon nitride and silicon oxide. The organic insulator may have a photosensitivity and dielectric constant less than about 4.0. The passivation layer 180 may include a lower film of an inorganic insulator and an upper film of an organic insulator such that it takes advantage of the insulating characteristics of the organic insulator while preventing the exposed portions of the semiconductor stripes 151 from being damaged by the organic insulator.

The passivation layer 180 has a plurality of contact holes 182 and 185 exposing the end portions 179 of the data lines 171 and the drain electrodes 175, respectively. The passivation layer 180 and the gate insulating layer 140 have a plurality of contact holes 181 exposing the end portions 129 of the gate lines 121, a plurality of contact holes 183a exposing portions of the storage electrode lines 131 near the first end portions of the first storage electrodes 133a, and a plurality of contact holes 183b exposing the linear branches of the second end portions of the first storage electrodes 133a.

A plurality of pixel electrodes 191, a plurality of overpasses 83, and a plurality of contact assistants 81 and 82 are formed on the passivation layer 180. They are preferably made of a transparent conductor such as ITO or IZO or a reflective conductor such as Ag, Al, Cr, or alloys thereof.

The pixel electrodes 191 are physically and electrically connected to the drain electrodes 175 through the contact holes 185 such that the pixel electrodes 191 receive data voltages from the drain electrodes 175. The pixel electrodes 191 supplied with the data voltages generate electric fields in cooperation with a common electrode 270 of the common electrode panel 200 supplied with a common voltage, which determines the orientations of liquid crystal molecules 31 of the liquid crystal layer 3 disposed between the two electrodes 191 and 270. A pixel electrode 191 and the common electrode 270 form a capacitor referred to as a "liquid crystal capacitor," which stores applied voltages after the TFT turns off.

A pixel electrode 191 overlaps a storage electrode line 131 including storage electrodes 133a-133d, and left and right edges of the pixel electrode 191 are disposed on the storage electrodes 133a and 133b. The pixel electrode 191 and a drain electrode 175 connected thereto and the storage electrode line 131 form an additional capacitor referred to as a "storage capacitor," which enhances the voltage storing capacity of the liquid crystal capacitor.

Each pixel electrode 191 is approximately shaped as a rectangle that has two pairs of main edges facing each other. The lower left and upper left corners of the edges of the pixel electrode 191 are chamfered with an angle of about 45 degrees from the gate lines 121 to form oblique edges 191oa and 191ob.

Each pixel electrode 191 has a center cutout 91, lower cutouts 92a and 93a, and upper cutouts 92b and 93b, which partition the pixel electrode 191. The center cutout 91 extends from the center of a right edge of the pixel electrode 191 approximately to the center of a left edge of the pixel electrode 191 to bisect the pixel electrode 191 into lower and upper halves 191a and 191b. Therefore, each of the lower and the upper halves 191a and 191b has two pairs of main edges facing each other. An upper right corner 91oa of the lower half 191a and a lower right corner 91ob of the upper half 191b, which correspond to an inlet of the center cutout 91, are chamfered with an angle of about 45 degrees from the gate lines 121 to form oblique edges. A lower transverse edge 91ta of the center cutout 91 forms an upper edge of the lower half 191a, and an upper transverse edge 91tb forms a lower edge of the upper half 191b. Since the distance between the transverse edges 91ta and 91tb gradually decreases from the right to the left, the angle made by the transverse edges 91ta and 91tb and the oblique edges 91oa and 91ob is larger than about 135 degrees.

The lower cutouts 92a and 93a are disposed on the lower half 191a and are substantially parallel to the upper right oblique edge 91oa of the lower half 191a, and the upper cutouts 92b and 93b are disposed on the upper half 191b and are substantially parallel to the lower right oblique edge 91ob of the upper half 191b.

The lower and upper cutouts 92a and 92b obliquely extend approximately from the right edge of the pixel electrode 191 approximately to the center of the pixel electrode 191, along a fourth storage electrode 133d, overlapping the fourth storage electrode 133d, to meet the transverse edges 91ta and 91tb of the center cutout 91. The lower and upper cutouts 93a and 93b obliquely extend from the left edge of the pixel electrode 191 approximately to the right corner of the pixel electrode 191, along a third storage electrode 133c, overlapping the third storage electrode 133c.

Portions of each edge of the lower and the upper edges 191a and 191b, which meet the cutouts 92a-93b or the oblique edges 191oa, 191ob, 91oa and 91ob with obtuse angles, make obtuse angles larger than about 135 degrees from the cutouts 92a-93b or the oblique edges 191oa, 191ob, 91oa and 91ob.

For example, a right edge 191ra of the lower half 191a includes a portion 191al, which extends from the lower right corner to an end of the lower cutout 92a substantially parallel to the data lines 171, and a remaining portion 191oa, which extends from the end of the lower cutout 92a to the oblique edge 91oa makes an oblique angle with the data lines 171 or the first and the second storage electrodes 133a and 133b to meet the oblique edge 91oa with an angle θ larger than about 135 degrees, as shown in FIG. 5.

Figure 6:
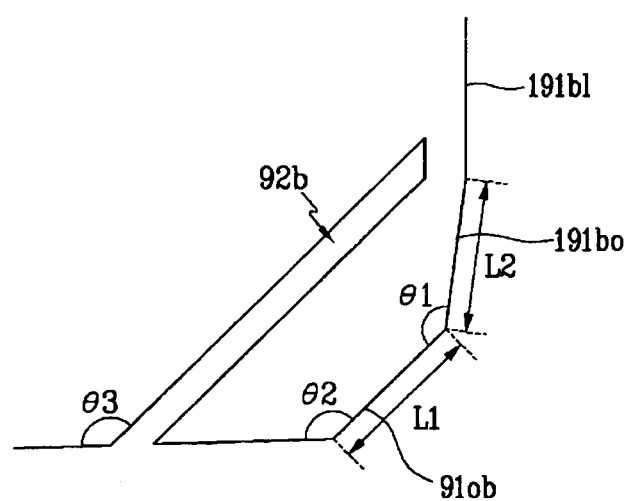
FIGS. 6, 7 and 8 are expanded views of portions of the LCD enclosed by circles VI, VII and VIII in FIG. 3, respectively.

Similarly, the right edge 191rb of the upper half 191b includes a portion 191rl, which extends from the upper right corner to an end of the upper cutout 92b substantially parallel to the data lines 171, and a remaining portion 191ro, which makes an oblique angle with the data lines 171 to meet the oblique edge 91ob with an angle θ1 larger than about 135 degrees as shown in FIG. 6.

Referring to FIG. 6, a length L1 of the oblique edges 91oa and 91ob is preferably greater than a half of a length L2 of the oblique portions 191ao and 191bo of the right edges 191al and 191*bl* that meet the oblique edges 91*oa* and 91*ob*, respectively. More preferably, the oblique edges 91*oa* and 91*ob* are longer than the oblique portions 191*ao* and 191*bo*.

Likewise, a portion of the left edge of the lower half 191*a*, which extends from the upper left corner to an end of the lower cutout 93*a*, meets the lower cutout 93*a* with an angle larger than about 135 degrees. In addition, a portion of the left edge of the upper half 191*b*, which extends from the lower left corner to an end of the upper cutout 93*b*, meets the upper cutout 93*b* with an angle larger than about 135 degrees. The left and the lower edges of the lower half 191*a* meet the oblique edge 191*oa* with an angle larger than about 135 degrees, and the left and the upper edges of the upper half 191*b* meet the oblique edge 191*ob* with an angle larger than about 135 degrees.

Moreover, the upper edge of the lower half 191*a* meets the oblique edge 91*ob* with an angle larger than about 135 degrees, and the lower edge of the upper half 191*b* meets the oblique edge 191*ob* with an angle θ2 larger than about is 135 degrees as shown in FIG. 6. A portion of the upper edge of the lower half 191*a*, which meets the lower cutout 92*a* with an obtuse angle, makes an angle larger than about 135 degrees with the lower cutout 92*a*. A portion of the lower edge of the upper half 191*b*, which meets the upper cutout 92*b* with an obtuse angle, makes an angle θ3 larger than about 135 degrees with the upper cutout 92*b* as shown in FIG. 6.

In this way, the lower half 191*a* of the pixel electrode 191 is partitioned into three lower partitions by the lower cutouts 92*a* and 93*a*, and the upper half 191*b* of the pixel electrode 191 is also partitioned into three upper partitions by the upper cutouts 92*b* and 93*b*. The number of partitions or the number of the cutouts is varied depending on design factors such as the size of pixels, the ratio of the transverse edges and the longitudinal edges of the pixel electrode 191, the type and characteristics of the liquid crystal layer 3, and so on.

The overpasses 83 cross over the gate lines 121 and they are connected to the exposed portions of the storage electrode lines 131 and the exposed linear branches of the second end portions of the first storage electrodes 133*a* through the contact holes 183*a* and 183*b*, respectively, which are disposed opposite each other with respect to the gate lines 121. The storage electrode lines 131 including the storage electrodes 133*a* and 133*b* along with the overpasses 83 can be used for repairing defects in the gate lines 121, the data lines 171, or the TFTs.

The contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and enhance the adhesion between the end portions 129 and 179 and external devices.

A description of the common electrode panel 200 follows with reference to FIGS. 2-4.

A light blocking member 220 referred to as a black matrix for preventing light leakage is formed on an insulating substrate 210 such as a transparent glass or plastic. The light blocking member 220 has a plurality of openings that face the pixel electrodes 191. The light blocking member 220 may have substantially the same planar shape as the pixel electrodes 191. The light blocking member 220 may also include a plurality of rectilinear portions facing the data lines 171 on the TFT array panel 100 and a plurality of widened portions facing the TFTs on the TFT array panel 100.

A plurality of color filters 230 are also formed on the substrate 210 and they are disposed substantially in areas enclosed by the light blocking member 220. The color filters 230 may extend substantially in the longitudinal direction along the pixel electrodes 191. The color filters 230 may represent one of the primary colors such as red, green and blue.

An overcoat 250 is formed on the color filters 230 and the light blocking member 220. The overcoat 250 is preferably made of an organic insulator and it prevents the color filters 230 from being exposed and provides a flat surface. In an alternate embodiment, the overcoat 250 may be omitted.

A common electrode 270 is formed on the overcoat 250. The common electrode 270 is preferably made of a transparent conductive material such as ITO and IZO and has a plurality of sets of cutouts 71, 72*a* and 72*b*.

A set of cutouts 71-72*b* faces a pixel electrode 191 and includes a center cutout 71, a lower cutout 72*a*, and an upper cutout 72*b*. Each of the cutouts 71-72*b* is disposed between adjacent cutouts 91-93*b* of the pixel electrode 191 or between a cutout 92*a* or 92*b* and a chamfered edge 191*oa* or 191*ob* of the pixel electrode 191. Each of the cutouts 71-72*b* has at least one longitudinal portion 71*la*, 71*lb*, 72*al*, 72*bl* and at least one oblique portion that has at least one depressed notch 7 and extends substantially parallel to the lower cutouts 92*a* and 93*a* or the upper cutouts 92*b* and 93*b* of the pixel electrode 191. The cutouts 71-72*b* substantially have an inversion symmetry with respect to the center cutout 92 of the pixel electrode 191.

Each of the lower and upper cutouts 72*a* and 72*b* includes an oblique portion 72*ao* or 72*bo*, a transverse portion 72 at or 72*bt*, and a longitudinal portion 72*al* or 72*bl*. The oblique portion 72*ao* or 72*bo* extends approximately from a left edge of the pixel electrode 191 approximately to a lower or upper edge of the pixel electrode 191. Each of the transverse and the longitudinal portions 72 at, 72*bt*, 72*al*, or 72*bl* extends from a respective end of the oblique portion 72*ao* or 72*bo* along an edge of the pixel electrode 191, overlapping the edge of the pixel electrode 191, and making an obtuse angle with the oblique portion 72*ao* or 72*bo*.

The center cutout 71 includes a pair of oblique portions 71*oa* and 71*ob* and a pair of longitudinal portions 71*la* and 71*lb*. The oblique portions 71*oa* and 71*ob* extend from the center of the left edge of the pixel electrode 191 approximately to the right edge of the pixel electrode 191. The longitudinal portions 71*la* and 71*lb* extend from the ends of their respective oblique portions 71*oa* and 71*ob* along the right edge of the pixel electrode 191, overlapping the right edge of the pixel electrode 191, and making obtuse angles with their respective oblique portions 71*oa* and 71*ob*.

The longitudinal portions 71*la*, 71*lb*, 72*al* or 72*bl* of each of the cutouts 71-72*b* have a longitudinal edge substantially parallel to the data lines 171 and an oblique edge oblique to the data lines 171. The longitudinal portions 71*la*, 71*lb*, 72*al* or 72*bl* becomes narrow as they extend beyond their respective oblique portions. The oblique edge of the longitudinal portion 71*al*, 71*lb*, 72*al* or 72*bl* is disposed within the pixel electrode 191 and meets an edge of the oblique portion 71*oa*, 71*ob*, 72*ao* or 72*bo* with an obtuse angle larger than about 135 degrees. The longitudinal edge of the longitudinal portion 71*la*, 71*lb*, 72*al* or 72*bl* is disposed away from the pixel electrode 191 and meets another edge of the oblique portion 71*oa*, 71*ob*, 72*ao* or 72*bo* making an angle of about 135 degrees.

Figure 7:
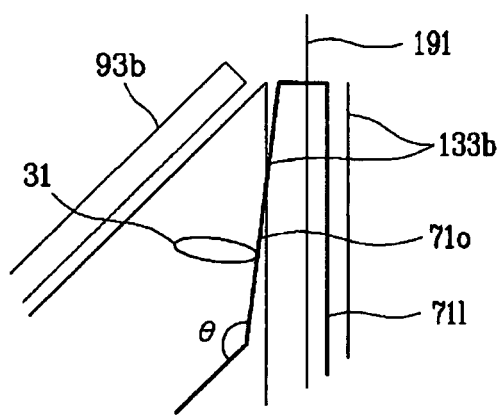

Referring to FIGS. 2 and 7, the reference numerals 71*l* and 71*o* denote the longitudinal edge and the oblique edge of the longitudinal portions 71*la* or 71*lb* of the central cutout 71, respectively, and an angle (p denotes the angle made by the oblique edge 71*o* of the longitudinal portion 71*lb* and an edge of the oblique portion 71*ob*.

Figure 8:
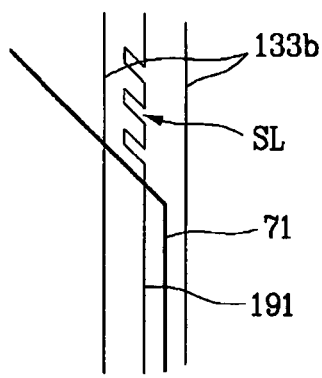

Portions of the edges of the pixel electrode 191, which meet the oblique portions 71oa, 71ob, 72ao and 72bo of the cutouts 71-72b at the common electrode 270, make an acute angle have a plurality of slits SL as shown in FIG. 8. The slits SL extend substantially parallel to the oblique portions 71oa, 71ob, 72ao and 72bo and they may be provided at the common electrode 270.

The number of the cutouts 71-72b may be varied depending on a number of design factors, and the light blocking member 220 may also overlap the cutouts 71-72b to block the leakage of light through the cutouts 71-72b.

Alignment layers 11 and 21 that may be homeotropic are coated on inner surfaces of the panels 100 and 200, and polarizers 12 and 22 are provided on outer surfaces of the panels 100 and 200 so that their polarization axes may be crossed. One of the polarization axes may be parallel to the gate lines 121. In addition, one of the polarizers 12 and 22 may be omitted when the LCD is a reflective type LCD.

The LCD may further include at least one retardation film (not shown) for compensating for retardation of the LC layer 3. The LCD may further include a backlight unit (not shown) for supplying light to the LC layer 3 through the polarizers 12 and 22, the retardation film, and the panels 100 and 200.

It is preferable that the LC layer 3 has negative dielectric anisotropy and is subjected to a vertical alignment with the LC molecules 31 in the LC layer 3 that are aligned such that their long axes are substantially vertical to the surfaces of the panels 100 and 200 in the absence of an electric field. Accordingly, incident light cannot pass the crossed polarizers 12 and 22.

Upon application of the common voltage to the common electrode 270 and a data voltage to a pixel electrode 191, an electric field substantially perpendicular to the surfaces of the panels 100 and 200 is generated. The pixel electrode 191 and the common electrode 191 will now be referred to as "field generating electrodes".

The LC molecules 31 tend to change their orientations in response to the electric field such that their long axes are perpendicular to the field direction. The cutouts 91-93b and 71-72b of the field generating electrodes 191 and 270 and the edges of the pixel electrodes 191 distort the electric field so that it has a horizontal component that is substantially perpendicular to the edges of the cutouts 91-93b and 71-72b and the edges of the pixel electrodes 191.

Referring to FIG. 3, a set of the cutouts 71-72b and 91-93b divides a pixel electrode 191 into ten sub-areas (e.g., five sub-areas PA1-PA5 in the lower half 191a and five sub-areas PB1-PB5 in the upper half). Each sub-area PA1-PA5 or PB1-PB5 has two primary edges making oblique angles with the major edges of the pixel electrode 191 and secondary edges that are portions of the main edges of the lower and the upper halves 191a and 191b. The primary edges of each sub-area PA1-PA5 or PB1-PB5 make an angle of about 45 degrees with the polarization axes of the polarizers 12 and 22 so that the light efficiency of the LCD may be maximized.

Except for the sub-areas PA1, PA5, PB1 and PB5 disposed at the corners of the lower and the upper halves 191a and 191b of the pixel electrode 191, the primary edges are much longer than the secondary edges and at least one of the secondary edges meets the primary edges making an angle larger than about 135 degrees. Therefore, the electric field of each sub-area PA2-PA4 or PB2-PB4 has a strong horizontal component perpendicular to the primary edges, which is much stronger than a horizontal component parallel to the primary edges. Accordingly, most LC molecules 31 on each sub-area PA2-PA4 or PB2-PB4 tilt perpendicularly to the primary edges.

Regarding the sub-areas PA1, PA5, PB1 and PB5 having the oblique edges 91oa, 91ob, 191oa and 191ob, which are disposed at the corners of the lower and the upper halves 191a and 191b of the pixel electrode 191, since the primary edges, e.g., the oblique edges 91oa, 91ob, 191oa and 191ob have a length greater than a half of the secondary edges, the LC molecules 31 on the sub-areas PA1, PA5, PB1 and PB5 are effectively controlled by the horizontal field component generated by the oblique edges 91oa, 91ob, 191oa and 191ob.

Furthermore, since the secondary edges meet the oblique edges 91oa, 91ob, 191oa and 191ob and make obtuse angles greater than about 135 degrees, the horizontal field components perpendicular to the primary edges on the sub-areas PA2-PA4 and PB2-PB4 are stronger than the horizontal field components parallel to the primary edges. Accordingly, most of the LC molecules 31 on the sub-areas PA1, PA5, PB1 and PB5 tilt perpendicular to the primary edges.

Moreover, regarding the slits SL shown in FIG. 8, which are disposed near the intersections between the edges of the pixel electrode 191 and the oblique portions 71oa, 71ob, 72ao and 72bo of the cutouts 71-72b of the common electrode 270 making acute angles and extending substantially parallel to the oblique portions 71oa, 71ob, 72ao and 72bo, since the slits SL make horizontal field components substantially perpendicular to the edges of the slits SL, the horizontal field components perpendicular to the primary edges become stronger in the sub-areas PA1-PA5 and PB1-PB5.

The sub-areas can be roughly classified into four classes on the basis of the tilt directions of the LC molecules 31, and it is preferable that the areas occupied by the four classes are equal to each other to improve the visibility of the LCD. The diversity of the tilt directions widens the reference viewing angle of the LCD.

A distance W between the primary edges of each sub-area PA1-PA5 or PB1-PB5 is preferably smaller than about 20 microns so that the horizontal field components having an appropriate strength to control the LC molecules 31 may be generated.

The notches 7 in the cutouts 71-72b of the common electrode 270 determine the tilt directions of the LC molecules 31 on the cutouts 71-72b and they may be provided at the cutouts 91-93b of the pixel electrodes 191.

It is to be understood by one of ordinary skill in the art that the shapes and the arrangements of the cutouts 71-72b and 91-93b and the notches 7 may be modified. Further, at least one of the cutouts 71-72b and 91-93b can be substituted with protrusions (not shown) or depressions (not shown). The protrusions are preferably made of an organic or inorganic material and can be disposed on or under the field generating electrodes 191 or 270.

An LCD according to another embodiment of the present invention will be described in detail with reference to FIGS. 9 and 10.

Figure 9:
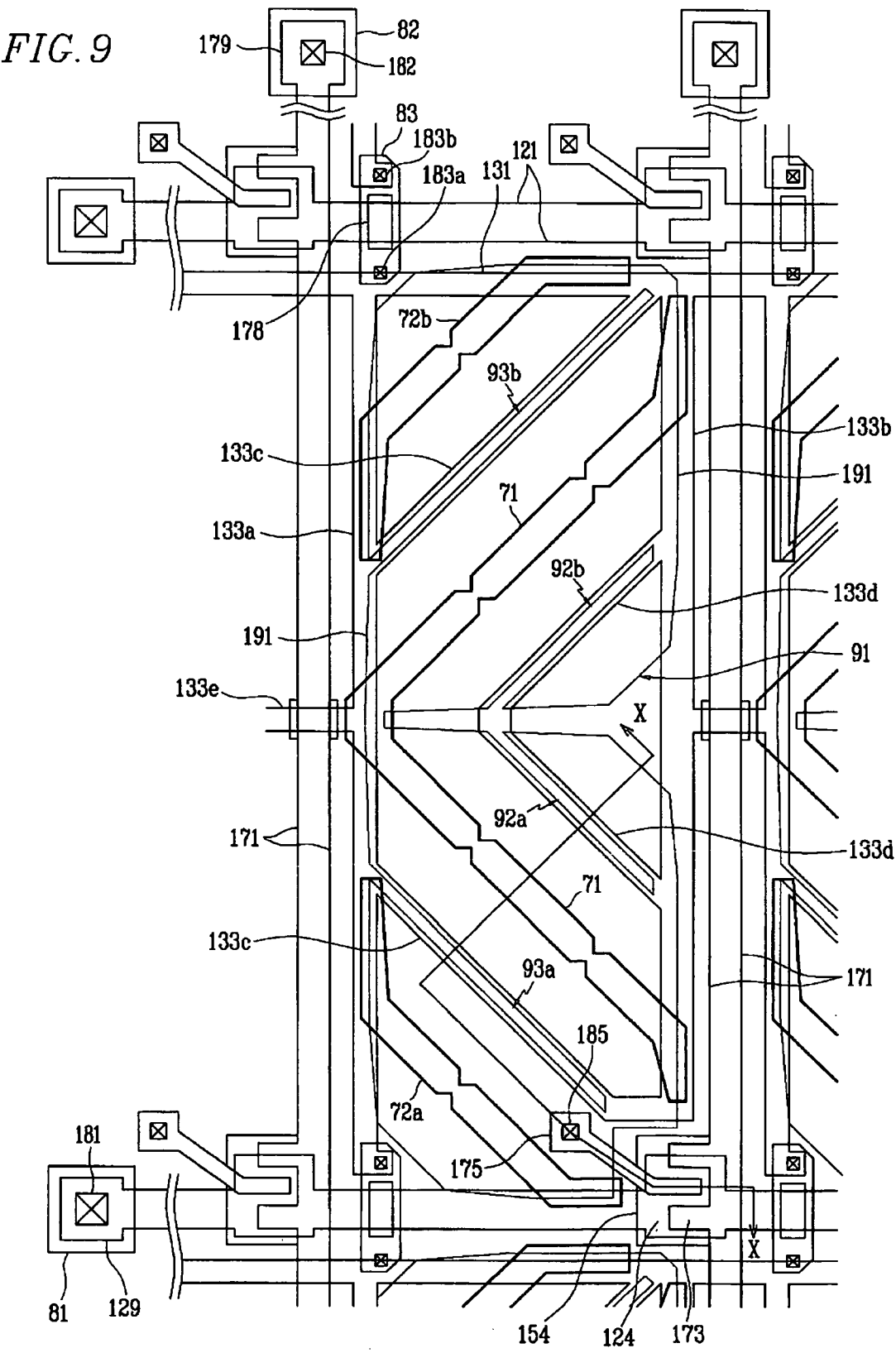
FIG. 9 is a layout view of an LCD according to another exemplary embodiment of the present invention.
Figure 10:
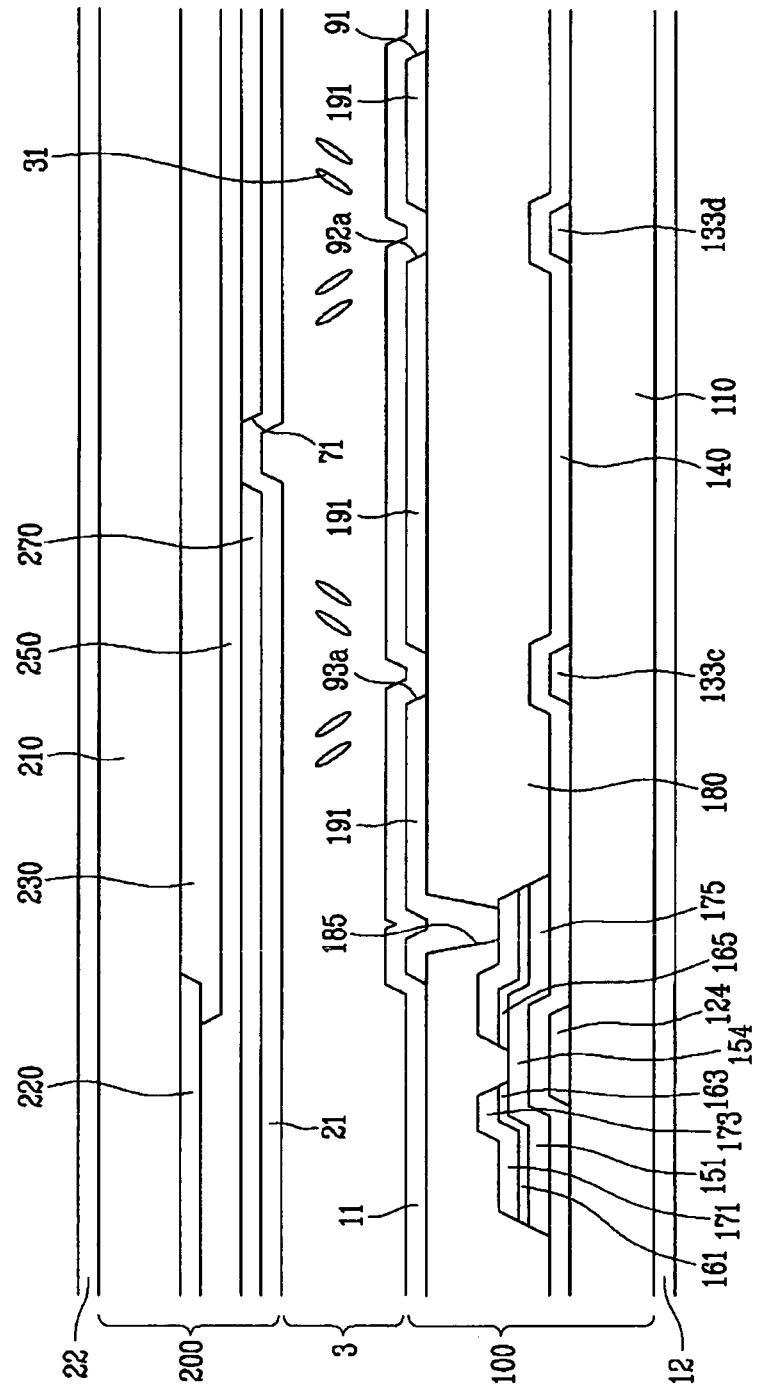
FIG. 10 is a sectional view of the LCD shown in FIG. 9 taken along a line X-X.

FIG. 9 is a layout view of an LCD according to another embodiment of the present invention, and FIG. 10 is a sectional view of the LCD shown in FIG. 9 taken along a line X-X.

Referring to FIGS. 9 and 10, an LCD includes a TFT array panel 100, a common electrode panel 200, an LC layer 3 a plurality of column spacers interposed between the panels 100 and 200, and a pair of polarizers 12 and 22 attached to outer surfaces of the panels 100 and 200.

Layered structures of the panels 100 and 200 according to this embodiment are almost the same as those shown in FIGS. 1-4.

Regarding the TFT array panel 100, a plurality of gate lines 121 and a plurality of storage electrode lines 131 are formed on an insulating substrate 110. Each of the gate lines 121 includes a plurality of gate electrodes 124 and an end portion 129 and each of the storage electrode lines 131 includes a plurality of storage electrodes 133a-133d and a plurality of storage connections 133e. A gate insulating layer 140, a plurality of semiconductor stripes 151 including projections 154, a plurality of ohmic contact stripes 161 including projections 163, and a plurality of ohmic contact islands 165 are sequentially formed on the gate lines 121 and the storage electrode lines 131.

A plurality of data lines 171 including source electrodes 173 and end portions 179, a plurality of drain electrodes 175, and a plurality of isolated metal pieces 178 are formed on the ohmic contacts 161 and 165, and a passivation layer 180 is formed thereon. A plurality of contact holes 181, 182, 183a, 183b and 185 are provided at the passivation layer 180 and the gate insulating layer 140. A plurality of pixel electrodes 191 having a plurality of cutouts 91-93b, a plurality of overpasses 83, and a plurality of contact assistants 81 and 82 are formed on the passivation layer 180, and an alignment layer 11 is coated thereon.

Regarding the common electrode panel 200, a light blocking member 220, a plurality of color filters 230, an overcoat 250, a common electrode 270 having a plurality of cutouts 71-72b, and an alignment layer 21 are formed on an insulating substrate 210.

As shown in FIGS. 9 and 10, the semiconductor stripes 151 of the TFT array panel 100 have almost the same planar shapes as the data lines 171 and the drain electrodes 175 as well as the underlying ohmic contacts 161 and 165. However, the projections 154 of the semiconductor stripes 151 include some exposed portions, which are not covered with the data lines 171 and the drain electrodes 175, such as portions located between the source electrodes 173 and the drain electrodes 175.

Furthermore, the TFT array panel 100 further includes a plurality of semiconductor islands (not shown) and a plurality of ohmic contact islands (not shown) disposed under the metal pieces 178.

A manufacturing method of the TFT array panel 100 includes simultaneously forming the data lines 171, the drain electrodes 175, the metal pieces 178, the semiconductors 151, and the ohmic contacts 161 and 165 using one photolithography process.

A photoresist pattern for the photolithography process has position-dependent thickness, and in particular, it has first and second portions with decreasing thicknesses. The first portions are located on wire areas that will be occupied by the data lines 171, the drain electrodes 175, and the metal pieces 178 and the second portions are located on channel areas of TFTs.

The position-dependent thickness of the photoresist is obtained by several techniques, which include for example, providing translucent areas on the exposure mask as well as providing transparent areas and light blocking opaque areas on the exposure mask. The translucent areas may have a slit pattern, a lattice pattern, a thin film or films with intermediate transmittances or intermediate thicknesses. When using a slit pattern, it is preferable that the width of the slits or the distance between the slits is smaller than the resolution of a light exposer used for the photolithography.

As an example, a reflowable photoresist may be used. For example, once a photoresist pattern made of a reflowable material is formed by using a normal exposure mask with only transparent areas and opaque areas, it is subject to a reflow process where the reflowable material flows onto areas not including the photoresist, thereby forming thin portions of photoresist. As a result, the manufacturing process of the TFT array panel 100 is simplified by omitting a photolithography step.

It is to be understood by one of ordinary skill in the art that many of the above-described features of the LCD shown in FIGS. 1-4 may be applied to the LCD shown in FIGS. 9 and 10.

An LCD according to another embodiment of the present invention will be described in detail with reference to FIGS. 11 and 12.

Figure 11:
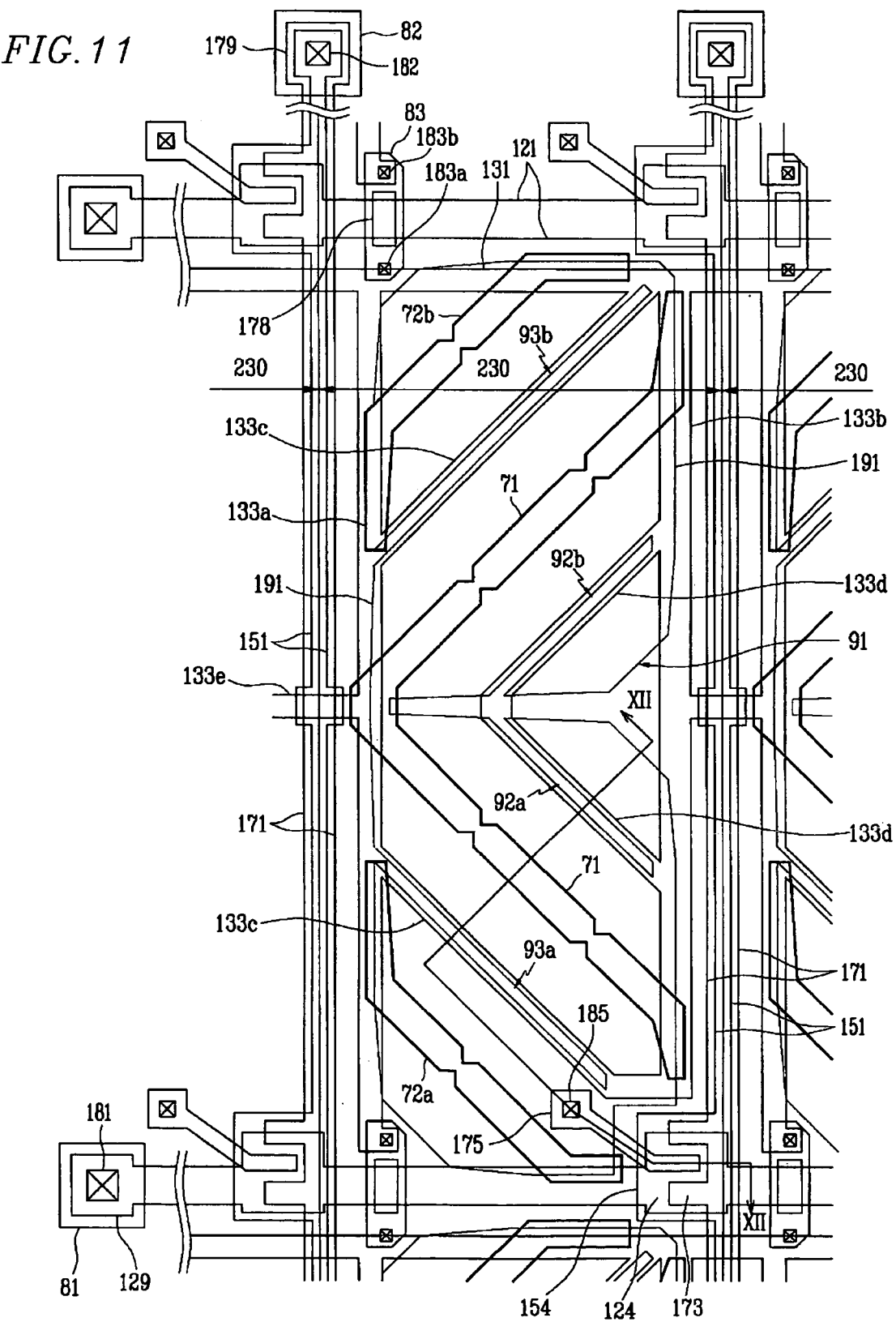
FIG. 11 is a layout view of an LCD according to another exemplary embodiment of the present invention.
Figure 12:
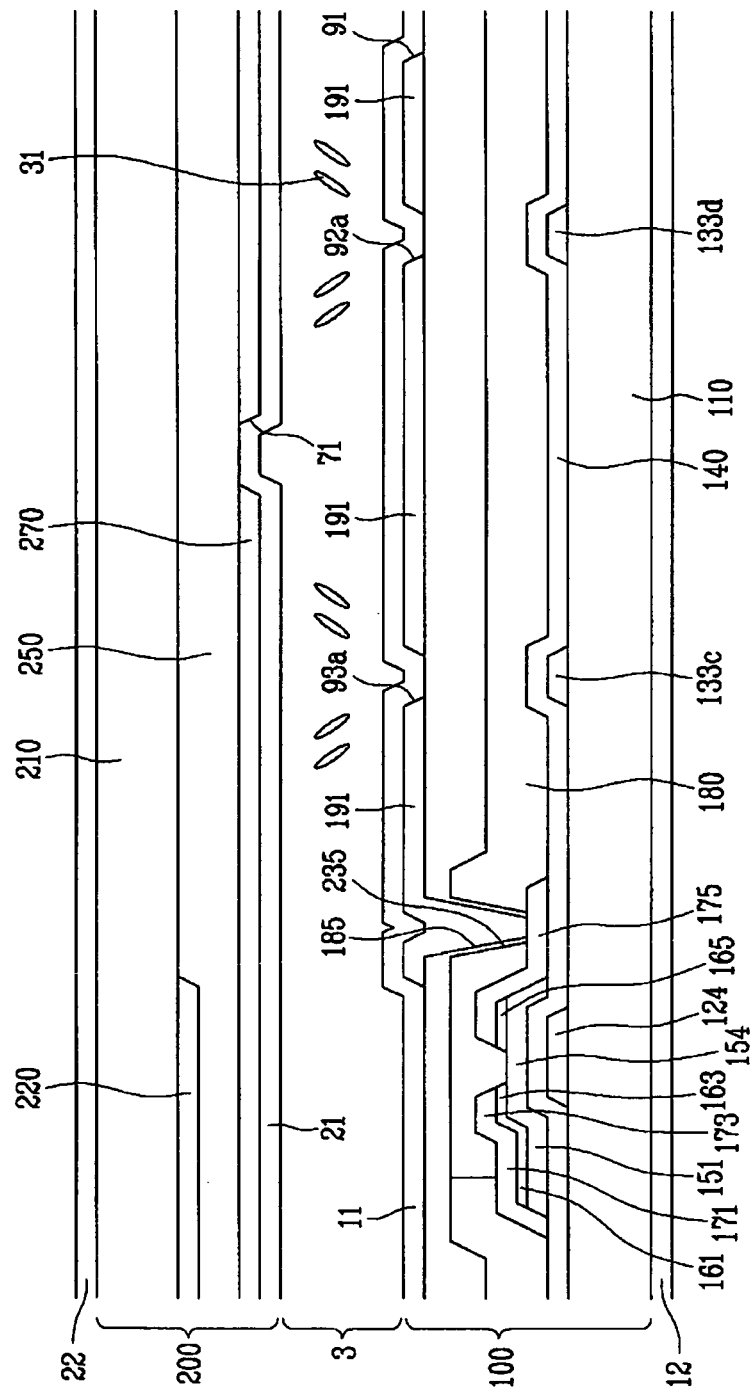
FIG. 12 is a sectional view of the LCD shown in FIG. 11 taken along a line XII-XII.

FIG. 11 is a layout view of an LCD according to another embodiment of the present invention, and FIG. 12 is a sectional view of the LCD shown in FIG. 11 taken along the line XII-XII.

Referring to FIGS. 11 and 12, an LCD includes a TFT array panel 100, a common electrode panel 200, an LC layer 3, a plurality of column spacers interposed between the panels 100 and 200, and a pair of polarizers 12 and 22 attached to outer surfaces of the panels 100 and 200.

Layered structures of the panels 100 and 200 according to this embodiment are almost the same as those shown in FIGS. 1-4.

Regarding the TFT array panel 100, a plurality of gate lines 121 and a plurality of storage electrode lines 131 are formed on an insulating substrate 110. Each of the gate lines 121 includes a plurality of gate electrodes 124 and an end portion 129 and each of the storage electrode lines 131 includes a plurality of storage electrodes 133a-133d and a plurality of storage connections 133e. A gate insulating layer 140, a plurality of semiconductor stripes 151 including projections 154, a plurality of ohmic contact stripes 161 including projections 163, and a plurality of ohmic contact islands 165 are sequentially formed on the gate lines 121 and the storage electrode lines 131.

A plurality of data lines 171 including source electrodes 173 and end portions 179, a plurality of drain electrodes 175, and a plurality of isolated metal pieces 178 are formed on the ohmic contacts 161 and 165, and a passivation layer 180 is formed thereon. A plurality of contact holes 181, 182, 183a, 183b and 185 are provided at the passivation layer 180 and the gate insulating layer 140. A plurality of pixel electrodes 191 having a plurality of cutouts 91-93b, a plurality of overpasses 83, and a plurality of contact assistants 81 and 82 are formed on the passivation layer 180, and an alignment layer 11 is coated thereon.

Regarding the common electrode panel 200, a light blocking member 220, an overcoat 250, a common electrode 270 having a plurality of cutouts 71-72b, and an alignment layer 21 are formed on an insulating substrate 210.

As shown in FIGS. 11 and 12, the TFT array panel 100 includes a plurality of color filters 230 disposed under the passivation layer 180, while the common electrode panel 200 has no color filter.

The color filters 230 extend like stripes in a longitudinal direction along columns of the pixel electrodes 191 and edges of two adjacent color filters 230 match with each other on the data lines 171. However, the color filters 230 may overlap each other to block the leakage of light between the pixel electrodes 191 like the light blocking member 220, or they may be spaced apart from each other. When the color filters 230 overlap each other, the light blocking member 220 disposed on a common electrode panel 200 may be omitted.

The color filters 230 have a plurality of through holes 235 through which the contact holes 185 pass, and the through holes 235 are larger than the contact holes 185. The color filters 230 are not provided at peripheral areas where the end portions 129 of the gate lines 121 and the end portions 179 of the data lines 171 are disposed.

It is to be understood by one of ordinary skill in the art that the LCD shown in FIGS. 11 and 12 can share many of the above-described features of the LCD shown in FIGS. 1-4.

While the present invention has been shown and described with reference to exemplary embodiments thereof, it will be understood by those of ordinary skill in the art that various changes in form and details may be made therein without departing from the spirit and scope of the present invention as defined by the following claims.

What is claimed is:

1. A display panel comprising:
   a first substrate;
   a gate line disposed on the first substrate;
   a data line intersecting the gate line; and
   a first electrode having a first electrode portion disposed above the substrate, the first electrode portion having two pairs of main edges facing each other and a first cutout oblique to the main edges,
   wherein the main edges include first and second edges, the first electrode portion has an oblique edge substantially parallel to the first cutout, the oblique edge connecting the first edge and the second edge, the first edge includes a first portion extending from the oblique edge to an end of the first cutout and a second portion substantially parallel to the data line, and
   wherein the first portion of the first edge is oblique with respect to the second portion of the first edge, the first portion of the first edge is oblique with respect to the oblique edge and the second edge extends across a central part of the first electrode in a direction substantially parallel to the gate line to define a side of a second cutout in the first edge of the first electrode portion, wherein the first edge of the first electrode portion is adjacent to the data line and the second cutout runs parallel to the gate line.

2. The display panel of claim 1, wherein the oblique edge is longer than the first portion of the first edge.

3. The display panel of claim 2, wherein the oblique edge makes an angle larger than about 135 degrees with the first portion of the first edge.

4. The display panel of claim 2, wherein the second portion of the first edge makes an obtuse angle with the first portion of the first edge.

5. The display panel of claim 2, wherein the first cutout meets the second edge.

6. The display panel of claim 5, wherein the second edge includes a portion meeting the first cutout making an angle larger than about 135 degrees.

7. The display panel of claim 5, wherein the first electrode portion has a third cutout extending substantially parallel to the first cutout and longer than the first cutout.

8. The display panel of claim 7, wherein the main edges further include:
   a third edge facing the first edge, wherein the third edge meets the second edge.

9. The display panel of claim 8, wherein the third edge comprises a portion meeting the third cutout and making an angle of about 135 degrees.

10. The display panel of claim 1, further comprising:
    a second electrode portion disposed above the substrate, connected to the first electrode portion, and substantially having an inversion symmetry with the first electrode portion.

11. The display panel of claim 10, wherein the first electrode portion and the second electrode portion are symmetrical with respect to a straight line extending nearly parallel to the second edge.

12. The liquid crystal display of claim 1, further comprising:
    a plurality of slits formed along the second portion of the first edge;
    a second substrate facing the first substrate; and
    a common electrode disposed on the second substrate,
    wherein the common electrode comprises an opening comprising an oblique portion, and
    wherein the slits extend substantially parallel to the oblique portion of the opening.

13. The liquid crystal display of claim 12, wherein at least one of the slits is disposed at a portion corresponding to the opening of the common electrode.

14. A liquid crystal display comprising:
    a gate line and a data line intersecting the gate line;
    a first electrode having a first electrode portion having two pairs of main edges that face each other;
    a common electrode facing the first electrode portion;
    a liquid crystal layer disposed between the first electrode portion and the common electrode;
    a plurality of first tilt direction determining members at the first electrode portion, which extend substantially parallel to each other and make oblique angles with the main edges of the first electrode portion, and determine tilt directions of liquid crystal molecules in the liquid crystal layer; and
    a plurality of second tilt direction determining members at the common electrode, which include first portions extending substantially parallel to the first tilt direction determining members, arranged alternate to the first tilt direction determining members, and determine tilt directions of liquid crystal molecules in the liquid crystal,
    wherein the first electrode portion is divided into a plurality of sub-areas by the first and the second tilt direction determining members and edges of the first electrode portion, each sub-area has a pair of primary edges extending substantially parallel to the first tilt direction determining members and a pair of secondary edges connecting the primary edges, the sub-areas include a first sub-area disposed near a corner of the first electrode portion, the primary edges of the first sub-area include a first edge and a second edge longer than the first edge, and
    wherein one of the secondary edges of the first sub-area is adjacent to the data line and oblique with respect to the data line and one of the secondary edges of the first sub-area extends across a central part of the first electrode in a direction substantially parallel to the gate line to define a side of a first cutout in an edge of the first electrode, wherein the edge of the first electrode is adjacent to the data line and the first cutout runs parallel to the gate line,
    wherein the second edge defines a side of a second cutout, and
    wherein the second cutout meets the first cutout at the side of the first cutout and extends in parallel to the first edge of the first sub-area.

15. The liquid crystal display of claim 14, wherein the first edge of the first sub-area is longer than one of the secondary edges of the first sub-area.

16. The liquid crystal display of claim 15, wherein the first edge of the first sub-area makes an angle larger than about 135 degrees with one of the secondary edges of the first sub-area.

17. The liquid crystal display of claim 16, wherein the first edge of the first sub-area and one of the secondary edges of the first sub-area are portions of the edges of the first electrode portion.

18. The liquid crystal display of claim 17, wherein the second edge of the first sub-area is a portion of the first tilt direction determining members.

19. The liquid crystal display of claim 18, wherein the first tilt direction determining members comprise cutouts formed at the first electrode portion.

20. The liquid crystal display of claim 15, wherein one pair of the primary and secondary edges of each sub-area makes an angle larger than 135 degrees.

21. The liquid crystal display of claim 20, wherein the pair of primary and secondary edges comprises:
    portions of the edges of the first electrode portion;
    a portion of the edges of the first electrode portion and a portion of the first tilt direction determining members;
    or portions of the second tilt direction determining members.

22. The liquid crystal display of claim 14, further comprising:
    a polarizer having a polarization axis that makes an angle substantially equal to about 45 degrees with the first tilt direction determining members.

23. The liquid crystal display of claim 14, wherein the number of the sub-areas is five.

24. The liquid crystal display of claim 14, wherein the first tilt direction determining members comprise cutouts formed at the first electrode portion, and the second tilt direction determining members comprise cutouts formed at the common electrode.

25. The liquid crystal display of claim 24, further comprising:
    a storage electrode overlapping the first tilt direction determining members.

26. The liquid crystal display of claim 14, further comprising:
    a second electrode member that is connected to the first electrode portion and substantially has an inversion symmetry with the first electrode portion.

27. The liquid crystal display of claim 14, wherein a distance between the primary edges of each sub-area is smaller than about 20 microns.

28. The liquid crystal display of claim 14, further comprising a plurality of slits formed along one of the main edges that is parallel to the data line,
    wherein the second tilt direction determining members comprise an oblique portion, and
    wherein the slits extend substantially parallel to the oblique portion of the second tilt direction determining members.

29. The liquid crystal display of claim 14, wherein at least one of the slits is disposed at a portion corresponding to the second tilt direction determining members.

30. A liquid crystal display comprising:
    a gate line and a data line intersecting the gate line;
    a first electrode;
    a second electrode facing the first electrode;
    a liquid crystal layer disposed between the first electrode and the second electrode; and
    a plurality of partitioning members that partition the first electrode into a plurality of sub-areas,
    wherein the sub-areas include a trapezoidal sub-area having a first edge, a second edge parallel to the first edge, a third edge and a fourth edge, wherein the second edge is shorter than the first edge, the third edge is adjacent to the data line and oblique with respect to the data line and the fourth edge extends across a central part of the first electrode in a direction substantially parallel to the gate line to define a side of a first partitioning member in an edge of the first electrode,
    wherein the edge of the first electrode is adjacent to the data line and the first partitioning member runs parallel to the gate line,
    wherein the first edge defines a side of a second partitioning member, and
    wherein the second partitioning member meets the first partitioning member at the side of the first partitioning member and extends in parallel to the second edge of the trapezoidal sub-area.

31. The liquid crystal display of claim 30, wherein the third edge makes an obtuse angle with the second edge.

32. The liquid crystal display of claim 31, wherein the third edge makes an angle larger than about 135 degrees with the second edge.

33. The liquid crystal display of claim 31, wherein the fourth edge makes an obtuse angle with the second edge.

34. The liquid crystal display of claim 30, wherein the first and second partitioning members are provided at the first electrode.

35. The liquid crystal display of claim 34, wherein the first and second partitioning members comprise cutouts formed at the first electrode.

36. The liquid crystal display of claim 30, further comprising:
    a polarizer having a polarization axis that makes an angle substantially equal to about 45 degrees with the first and second partitioning members.

37. The liquid crystal display of claim 30, wherein a distance between primary edges of each sub-area is smaller than about 20 microns.

38. The liquid crystal display of claim 30, further comprising a plurality of slits formed along an edge of the first electrode that is parallel to the data line,
    wherein the second electrode comprises an opening comprising an oblique portion, and
    wherein the slits extend substantially parallel to the oblique portion of the opening of the second electrode.

39. The liquid crystal display of claim 38, wherein at least one of the slits is disposed at a portion corresponding to the opening of the second electrode.

\* \* \* \* \*